United States Patent
Braghiroli

(10) Patent No.: US 9,212,964 B2
(45) Date of Patent: Dec. 15, 2015

(54) METHOD AND APPARATUS FOR DETERMINING GEOMETRICAL DIMENSIONS OF A WHEEL

(75) Inventor: Francesco Braghiroli, Reggio Emilia (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 138 days.

(21) Appl. No.: 13/034,186

(22) Filed: Feb. 24, 2011

(65) Prior Publication Data

US 2011/0208476 A1 Aug. 25, 2011

(30) Foreign Application Priority Data

Feb. 24, 2010 (EP) .................................... 10001916

(51) Int. Cl.
| | |
|---|---|
| *G01B 7/315* | (2006.01) |
| *G01M 1/02* | (2006.01) |
| *G01B 17/06* | (2006.01) |
| *G01M 17/02* | (2006.01) |
| G01B 21/02 | (2006.01) |
| G01B 21/10 | (2006.01) |
| G01P 15/18 | (2013.01) |

(Continued)

(52) U.S. Cl.
CPC ................. *G01M 1/02* (2013.01); *G01B 17/06* (2013.01); *G01M 17/025* (2013.01); *G01B 11/02* (2013.01); *G01B 21/02* (2013.01); *G01B 21/10* (2013.01); *G01B 21/20* (2013.01); *G01P 15/18* (2013.01)

(58) Field of Classification Search
CPC ........ G01B 21/02; G01B 21/10; G01B 11/02; G01P 15/18

USPC .......... 702/155, 159, 157, 94, 150, 163, 151, 702/153, 141, 56, 85, 104, 97, 145, 148, 702/158, 171; 33/203, 700, 746, 797, 798

See application file for complete search history.

(56) References Cited

U.S. PATENT DOCUMENTS

| | | | |
|---|---|---|---|
| 6,873,931 B1 * | 3/2005 | Nower et al. ................. | 702/151 |
| 7,949,398 B1 * | 5/2011 | Wenzel et al. ................. | 607/42 |

(Continued)

FOREIGN PATENT DOCUMENTS

| | | |
|---|---|---|
| CN | 101068309 A | 11/2007 |
| EP | 0 358 496 A2 | 3/1990 |

OTHER PUBLICATIONS

English translation of Chinese Office Action dated Oct. 10, 2014, issued in corresponding Chinese Patent Application No. 201110048546.0.

(Continued)

*Primary Examiner* — Paul D Lee
(74) *Attorney, Agent, or Firm* — McDermott Will & Emery LLP

(57) ABSTRACT

Method and apparatus for determining geometrical dimensions of a wheel, especially a vehicle wheel, or of at least a part of the wheel, comprising the steps of pivoting at least one sensing device for scanning the wheel surface or a part of the wheel surface about a pivot axis in plane perpendicular to the wheel axis and determining the geometrical dimensions of the scanned wheel surface in dependence from the angular position of the at least one sensing device, wherein the angular position is determined from measured accelerations of the sensing device in two predetermined directions during the pivotal movement of the sensing device.

13 Claims, 2 Drawing Sheets

(51) Int. Cl.
  *G01B 11/02* (2006.01)
  *G01B 21/20* (2006.01)

(56) References Cited

U.S. PATENT DOCUMENTS

2003/0197603 A1* 10/2003 Stewart et al. ................ 340/442
2004/0083811 A1* 5/2004 Kranz ............................ 73/490
2009/0033949 A1* 2/2009 Braghiroli ..................... 356/635
2011/0083271 A1* 4/2011 Bhai ................................ 5/610

OTHER PUBLICATIONS

English translation of Chinese Office Action dated Jul. 1, 2015, issued in corresponding Chinese Patent Application No. 201110048546.0.

* cited by examiner

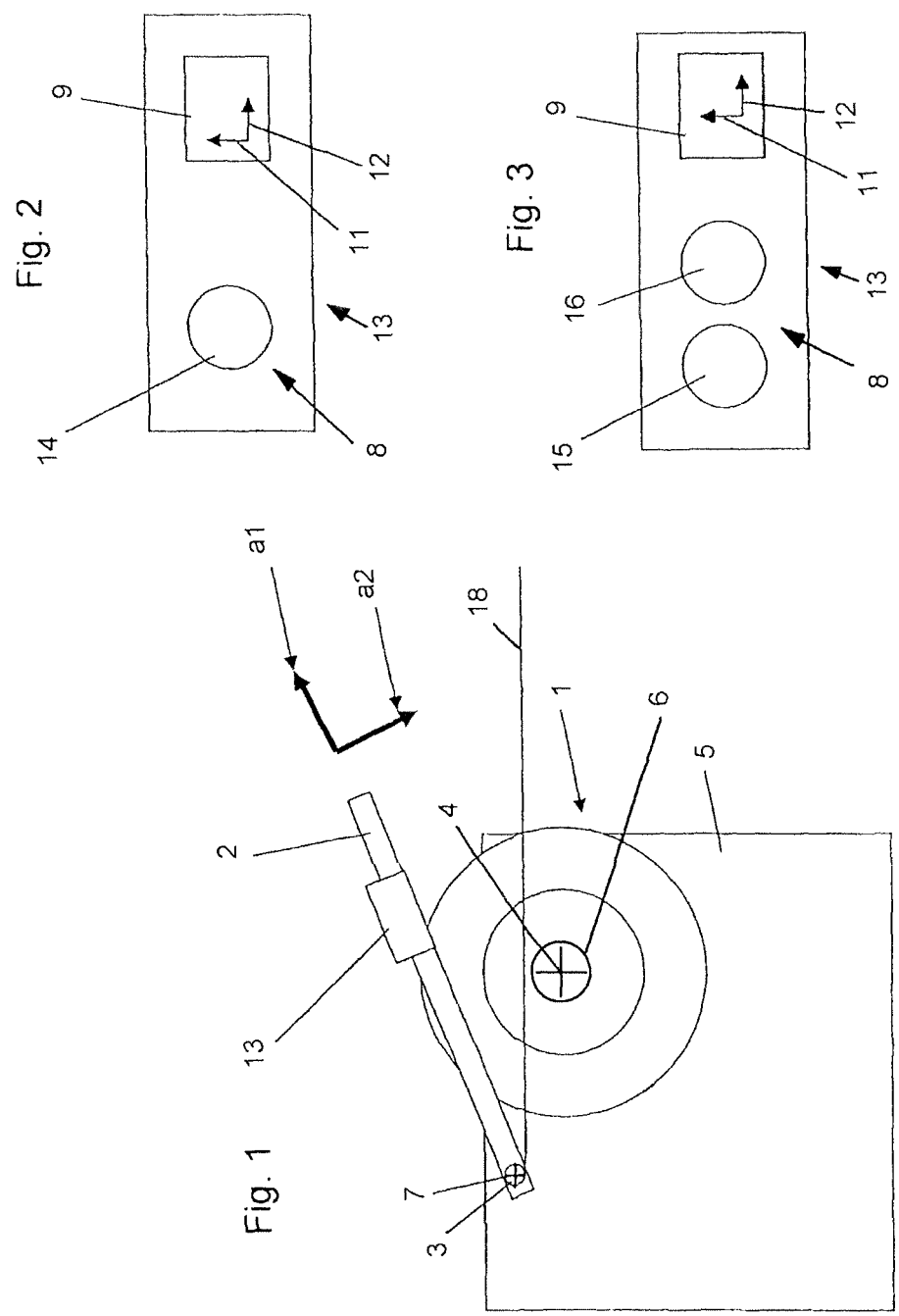

METHOD AND APPARATUS FOR DETERMINING GEOMETRICAL DIMENSIONS OF A WHEEL

TECHNICAL FIELD

The present invention concerns a method and an apparatus for determining geometrical dimensions of a wheel according to the preambles of claim 1 and claim 8.

BACKGROUND

It is known from EP 0 358 496 B2 to measure dimensions of a wheel, especially a vehicle wheel by means of ultrasonic sensors scanning the wheel surface or a part of the wheel surface. The ultrasonic sensors are mounted on a pivot member and, during the measurement, the ultrasonic sensors pivot about a pivot axis by means of the pivot member. For the detection of the angular position of the pivot member, a rotary type potentiometer is connected via transmission means to the pivot member.

SUMMARY

Object of the invention is to provide a method and an apparatus for determining geometrical dimensions of a wheel, especially of a vehicle wheel with reduced structural features.

The invention provides a method for determining geometrical dimensions of a wheel, especially of a vehicle wheel, or of at least a part of the wheel. The method comprises the steps of pivoting at least one sensing device for scanning the wheel surface or a part of the wheel surface about a pivot axis in a plane perpendicular to the wheel axis and of determining the geometrical dimensions of the scanned wheel surface in dependence from the pivot angle of the at least one sensing device. The pivot angle is determined from measured accelerations of the sensing device in two predetermined directions during the pivotal movement of the sensing means. The directions in which the accelerations are measured extend preferably in the plane of the pivotal movement of the sensing means or in a thereto parallel plane.

The two accelerations can be measured in two orthogonal directions, especially in the radial direction of the pivotal movement of the at least one sensing device and in an orthogonal direction thereto.

The sensing device can be designed to measure the distance between the scanned spot on the wheel surface and the sensing device, wherein the wheel surface can be scanned by ultrasonic or optical waves, for example by a laser radiation.

The measured geometrical data can be used to determine a rim profile of a vehicle wheel which is designed as a tire/rim assembly. Further, the wheel type or other properties of the wheel can be derived from the measured data.

Further, the angular velocity of the pivotal movement of the at least one sensing device can be determined from the measured accelerations, wherein the determined velocity data and/or the measured acceleration data can be used to observe the movement of the sensing device during the scanning operation in view of avoiding operational errors and/or to control the movement of the sensing device.

The invention can be incorporated into an equipment device for maintenance and repair and for other services to be performed on vehicle wheels, for example into wheel balancers or tire changers.

Further, the invention provides an apparatus for determining the geometrical dimensions of a wheel, especially a vehicle wheel, or of at least a part of the wheel. The apparatus comprises a machine frame having a shaft for mounting the wheel and a bearing for pivotal support of a pivot member on the machine frame, wherein the axis of the shaft and the pivot axis of the bearing are substantially parallel to each other. At least one sensing device is mounted on the pivot member for scanning the wheel surface or at least one part of the wheel surface. An angle measuring device measures the angular positions during the pivotal motion of the pivot member and computing means determines the geometrical dimensions of the wheel surface in dependence of the measured pivot angle.

The angle measuring device includes accelerometer means adapted to measure accelerations of the at least one sensing device in two predetermined directions, and computing means to determine from the measured accelerations the angular positions of the at least one sensing device during its pivotal movement. Particularly, the accelerometer means is sensitive in two orthogonal directions, especially in radial direction of the pivotal motion of the sensing device and in an orthogonal direction thereto. Preferably, the accelerometer means is designed in the form of a dual axis accelerometer. The pivotal motion of the sensing device is performed in a plane which is perpendicular to the wheel axis and the measurement of the acceleration is conducted in that plane or in a plane parallel thereto.

The accelerometer means are connected rigidly to the sensing device in order to be rotated about the pivot axis of the pivot member simultaneously with the sensing device. Preferably, the accelerometer means is mounted together with the sensing device on a pivotally arranged part of the pivot member. The sensing device and the angle measuring device can be integrated in one measuring unit. The accelerometer means can be designed as Micro-Electro-Mechanical Systems (MEMS) or Micromachined Accelerometers (MMA) or otherwise like Shear Mode Accelerometer or Micromachined Piezo Resistives etc. Gravimetricly detected gravity components in the two orthogonal directions of the acceleration sensitivities of the accelerometer can be compensated.

The sensing device which scans the wheel surface is preferably designed for measuring or detecting the distance between the scanned area and the sensing device and can include one or more ultrasonic or optical sensors which are able to measure distances. Preferably, on each side of the wheel a sensing device can be arranged pivotably. The invention can be used for determining the geometrical dimension of a vehicle wheel to be balanced. For that, the sensing devices and the accelerometer means are arranged to be pivoted together with a hood of the wheel balancer. The sensing device and the accelerometer means can be connected directly or by means of the pivot member to the hood.

BRIEF DESCRIPTION OF THE DRAWINGS

The invention will be explained additionally by means of embodiments illustrated schematically in the enclosed Figures which show in FIG. 1 an embodiment of the invention;

FIG. 2 a first example of measuring unit which can be incorporated in the embodiment of FIG. 1;

FIG. 3 a second example of a measuring unit which can be incorporated in the embodiment of FIG. 1;

DETAILED DESCRIPTION

Figure 4:
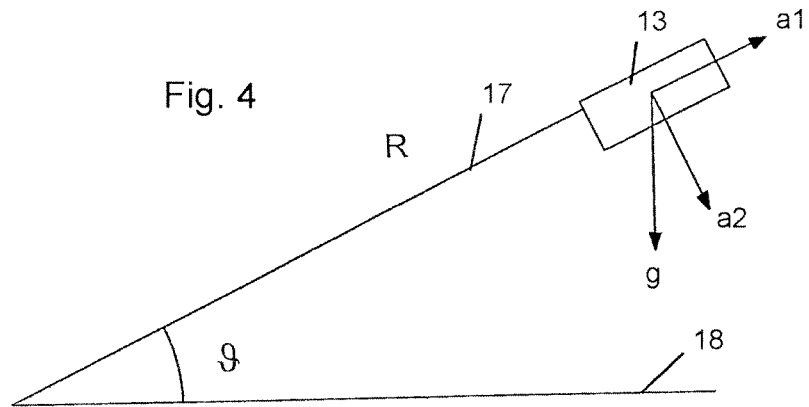
FIG. 4 a diagram explaining the operation of the embodiment of FIG. 1.

FIG. 1 illustrates schematically a service machine which is used for handling a wheel 1, especially a vehicle wheel in the form of a rim/tire assembly. The service machine includes a machine frame 5 having a shaft 6 onto which the wheel 1 can be mounted and a bearing 3 for pivotal support of a pivot member 2 on the machine frame 5. An axis 4 of the shaft 6 and a pivot axis 7 of the bearing 3 are substantially parallel to each other. The wheel 1 is mounted on the shaft 6 such that the wheel axis and the shaft axis 4 are coaxially arranged.

At least one sensing device 8 (FIG. 2) is mounted on the pivot member 2 for scanning the wheel surface or at least one part of the wheel surface. Two sensing devices can be provided to scan the wheel surfaces on both sides, wherein the pivot member 2 can be configured as it is known from EP 0 358 496 B2.

Figure 5:
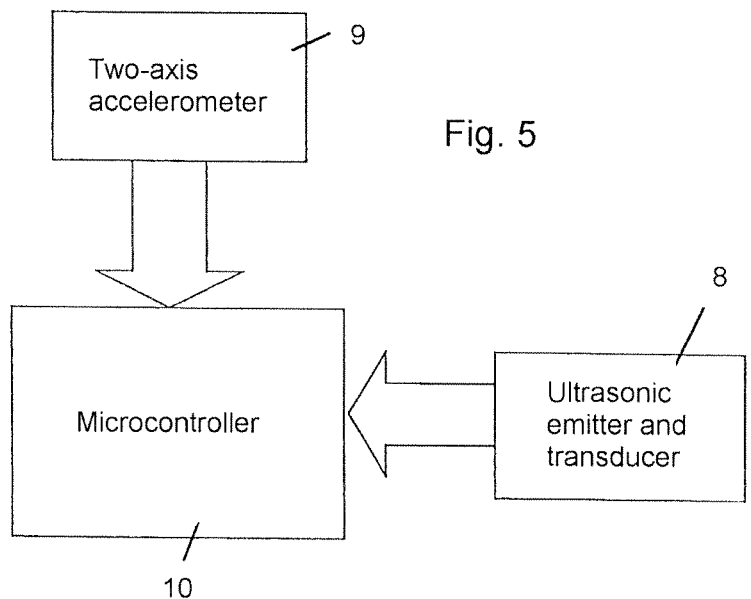
FIG. 5 a block diagram showing the co-operation of the components incorporated in the embodiment of FIG. 1.

An angle measuring device 9 (FIG. 2) measures the angular positions during the pivotal motion of the member 2. The angle measuring device 9 can be incorporated in a measuring unit 13, as will be explained below in connection with FIGS. 2 and 3. Computing means 10 (FIG. 5) determines the geometrical dimensions of the wheel surface in dependence of the measured pivot angle. The angle measuring device 9 includes accelerometer means 11, 12 adapted to measure accelerations of the at least one sensing device 8 in two predetermined directions a1 and a2 and the computing means 10 is designed to determine from the measured accelerations the angular positions of the at least one sensing device 8 during its pivotal movement.

The accelerometer means 11, 12 are sensitive in two orthogonal directions, especially in a radial direction of the pivot motion of the sensing device 8 and in an orthogonal direction thereto. Preferably, the accelerometer means 11, 12 are configured as a dual axis accelerometer (FIGS. 2 and 3).

The accelerometer means 11, 12 are connected rigidly to the sensing device 8 and are moved together with the sensing device 8. Preferably, the sensing device 8 and the angle measuring device 9 including the accelerometer means 11, 12 are integrated in one measuring unit 13, as shown in the FIGS. 2 and 3.

The accelerometer means 11, 12 and the sensing device 8, which can be integrated into the measuring unit 13, are mounted on the pivotally arranged part of the pivot member 2.

The swingable or pivotally arranged part of the pivot member 2 rotates during the scanning measurement about the axis 7 defined in the bearing 3.

The sensing device 8 can detect the distance between the scanned surface area and the sensing device 8 and can be configured in the form of an ultrasonic sensing device having an ultrasonic emitter/receiver transducer 14 (FIG. 2) or an emitter 15 and a receiver 16 (FIG. 3) for emitting ultrasonic waves to the scanned surface area of the wheel surface and for receiving therefrom reflected waves to measure the respective distance. Instead of the ultrasonic system, an optical distance measuring system which can operate on a triangulation basis can be used. The emitter 15 can be a laser and the receiver 16 is a light sensitive detector receiving reflected light from the scanned area in a well known arrangement.

The service machine schematically shown in FIG. 1 can be a wheel balancer or a tire changer, wherein the wheel 1 can be mounted on the shaft 6 in a vertical arrangement as shown in FIG. 1 or in a substantially horizontal arrangement.

The operation of the embodiment is the following:

The rotational movement of the pivot member 2 for a scanning measurement starts from a predetermined angular position which can be defined on the machine frame 5 by means of an appropriate abutment. In a wheel balancer, the initial position can be defined by the open hood position which corresponds to the upper position of the pivot member 2 shown in FIG. 1 which corresponds to the angular position 17 of FIG. 4. During the measurement, the sensing device 8 and the accelerometer means 11, 12 are pivoted to the second end position 18 (FIGS. 1 and 4) along an angular pivot path $\vartheta$ about the fixed pivot axis 7.

During the distance measurement of the sensing device 8, the accelerometer means 11, 12 of the angular measuring device 9 read simultaneously the angular acceleration of the sensing device 8 and with the aid of the computer means 10 (FIG. 5) the respective angular positions of the sensing device 8 are determined. Probably, the angular velocity is determined additionally.

In the embodiment of FIG. 1, the one axis a1 of the accelerometer means extends in the radial direction of the pivotal motion and the second axis a2 extends orthogonally (tangentially) thereto. The axis a1 and a2 extend in a plane within which the sensing device 8 and the accelerometer means 11, 12 are pivoted during the scanning measurement or in a plane parallel thereto.

The computing means 10 evaluates the measured data according to the following set of equations:

Radial (or normal centripetal) acceleration is given by:

$$a_N = \omega^2 \cdot R$$

Tangential acceleration is given by:

$$a_T = R \cdot \frac{d\omega}{dt} = R \cdot \alpha_0$$

Where $\vartheta$ is the angular position of the supporting arm, $$\omega = \frac{d\vartheta}{dt}$$

is its angular velocity, $$\alpha = \frac{d\omega}{dt}$$

is its angular acceleration, R is the radius of curvature, that is the length of the supporting arm.

The problem of determining actual readings of the rim profile, angular velocity and angular acceleration from the readings of the accelerometer axis a1 and a2 is described by the following set of equations:

$$\begin{cases} a_1 = a_N - g \cdot \sin\vartheta = \omega^2 \cdot R - g \cdot \sin\vartheta \\ a_2 = a_T + g \cdot \cos\vartheta = R \cdot \frac{d\omega}{dt} + g \cdot \cos\vartheta = R \cdot \alpha + g \cdot \cos\vartheta \end{cases}$$

Where $\vartheta$ is the angular position of the supporting arm, $$\omega = \frac{d\vartheta}{dt}$$

is its angular velocity, $$\alpha = \frac{d\omega}{dt}$$

is its angular acceleration, R is the radius of curvature, that is the length of the supporting arm, g is the standard gravity (normal acceleration due to gravity at the Earth's surface at sea level: 9.80665 m/s$^2$).

In order to determine the angular position and/or the angular velocity, the set of equations can be solved for example by numerical methods such as relaxation methods or similar.

From the distance data measured by the sensing device 8 and the thereto associated angular positions measured by the accelerometer means 11, 12, the computing means 10 determine the required geometrical dimensions of the scanned wheel surface.

LIST OF REFERENCE SIGNS

1 wheel
2 pivot member
3 bearing
4 shaft axis (wheel axis)
5 machine frame
6 shaft
7 pivot axis
8 sensing device
9 angle measuring device
10 computing means
11 accelerometer means
12 accelerometer means
13 measuring unit
14 emitter/receiver transducer
15 emitter
16 receiver
17 angular end position
18 angular end position

The invention claimed is:

1. A method for maintaining and repairing wheels, comprising the steps of:
   pivoting a pivot member, upon which is mounted at least one sensing device for scanning a wheel surface or a part of the wheel surface and accelerometer means measuring accelerations in two predetermined orthogonal directions, about a pivot axis in a plane perpendicular to the wheel axis,
   scanning, with the sensing device, the wheel surface or a part of the wheel surface during the pivoting motion of the pivot member,
   measuring, with the accelerometer means, accelerations of the sensing device in two predetermined orthogonal directions during the pivoting motion of the pivot member,
   determining the angular position of the at least one sensing device from the measured accelerations, by computing means, and
   determining the geometrical dimensions of the scanned wheel surface in dependence of the angular position, by the computing means,
   wherein the determined geometrical dimensions are used to perform wheel balancing.

2. The method according to claim 1, wherein one of the two predetermined directions is the radial direction of the pivotal movement of the at least one sensing device.

3. The method according to claim 1, wherein the distance between the scanned spot on the wheel surface and the sensing device is measured.

4. The method according to claim 1, wherein the wheel surface is scanned by ultrasonic or optical waves.

5. The method according to claim 1, wherein a rim profile of a vehicle wheel is determined from the scanned geometrical dimensions.

6. The method according to claim 1, wherein the angular velocity of the pivotal movement of the at least one sensing device is determined from the measured accelerations.

7. An apparatus for maintaining and repairing wheels, comprising:
   a machine frame having a shaft for mounting a wheel and a substantially parallel bearing for pivotal support,
   a pivot member supported by the bearing and pivoting about a pivot axis in a plane perpendicular to the axis of the shaft;
   at least one sensing device mounted on the pivot member for scanning the wheel surface or at least one part of the wheel surface;
   accelerometer means mounted on the pivot member and measuring accelerations of the at least one sensing device in two predetermined orthogonal directions during its pivotal movement;
   computing means determining the angular position of the at least one sensing device from the measured accelerations and determining the geometrical dimensions of the wheel in dependence of the determined angular position.

8. The apparatus according to claim 7, wherein the accelerometer means are sensitive in the radial direction of the pivot motion of the sensing device and in an orthogonal direction thereto.

9. The apparatus according to claim 7, wherein the accelerometer means are connected rigidly to the sensing device.

10. The apparatus according to claim 7, wherein the accelerometer means are mounted on the pivotally arranged part of the pivot member.

11. The apparatus according to claim 7, wherein the sensing device and the accelerometer means are integrated in one measuring unit.

12. The apparatus according to claim 7, wherein the accelerometer means are designed as Micro-Electro-Mechanical Systems.

13. The apparatus according to claim 7, wherein the sensing device includes at least one ultrasonic sensor or optical sensor.

* * * * *